United States Patent
Araki et al.

(10) Patent No.: US 8,263,285 B2
(45) Date of Patent: Sep. 11, 2012

(54) MEMBRANE-ELECTRODE ASSEMBLY AND FUEL CELL HAVING THE SAME

(75) Inventors: Yasushi Araki, Gotemba (JP); Kimihide Horio, Aichi-ken (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 476 days.

(21) Appl. No.: 12/521,635

(22) PCT Filed: Feb. 5, 2008

(86) PCT No.: PCT/JP2008/052212
§ 371 (c)(1),
(2), (4) Date: Jun. 29, 2009

(87) PCT Pub. No.: WO2008/096887
PCT Pub. Date: Aug. 14, 2008

(65) Prior Publication Data
US 2010/0323271 A1 Dec. 23, 2010

(30) Foreign Application Priority Data
Feb. 6, 2007 (JP) .................. 2007-026656

(51) Int. Cl.
*H01M 8/10* (2006.01)
*H01M 4/86* (2006.01)
(52) U.S. Cl. ......... 429/483; 429/492; 429/523; 429/530
(58) Field of Classification Search .................. 429/483, 429/444, 431, 432, 435, 415, 492, 523, 530
See application file for complete search history.

(56) References Cited

U.S. PATENT DOCUMENTS

| 6,015,634 | A | * | 1/2000 | Bonville et al. ............... 429/415 |
| 2004/0058227 | A1 | | 3/2004 | Tanaka et al. |
| 2004/0081877 | A1 | | 4/2004 | Kim et al. |
| 2006/0003195 | A1 | | 1/2006 | Noh |
| 2006/0068270 | A1 | | 3/2006 | Ino et al. |

FOREIGN PATENT DOCUMENTS

| EP | 1 429 403 A2 | 6/2004 |
| JP | 8-88008 | 4/1996 |
| JP | 9-180730 | 7/1997 |
| JP | 11-288727 | 10/1999 |

(Continued)

OTHER PUBLICATIONS

Machine Translation of: JP 2006/286329 Kato et al., Oct. 19, 2006.*

(Continued)

*Primary Examiner* — Jonathan Crepeau
*Assistant Examiner* — Kenneth Douyette
(74) *Attorney, Agent, or Firm* — Finnegan, Henderson, Farabow, Garrett & Dunner, LLP

(57) ABSTRACT

A membrane-electrode assembly (10) is characterized by including an electrolytic membrane (11) having proton conductivity and a first electrode (12) jointed on the electrolytic membrane. The first electrode has a catalyst (121, 122) and a first ionomer (123) covering the catalyst and acting as a proton exchange group. A ratio of water-generation amount (mol/min) at rated output point of the membrane-electrode assembly/volume ($cm^3$) of the first ionomer in the first electrode is 1350 or larger.

8 Claims, 10 Drawing Sheets

FOREIGN PATENT DOCUMENTS

| | | |
|---|---|---|
| JP | 2001-338654 | 12/2001 |
| JP | 2003-282078 | 10/2003 |
| JP | 2004-111191 | 4/2004 |
| JP | 2004-206915 | 7/2004 |
| JP | 2004-349076 | 12/2004 |
| JP | 2005-19285 | 1/2005 |
| JP | 2005-56583 | 3/2005 |
| JP | 2005-135787 | 5/2005 |
| JP | 2005-235461 | 9/2005 |
| JP | 2006-19261 | 1/2006 |
| JP | 2006-85959 | 3/2006 |
| JP | 2006-252966 | 9/2006 |
| JP | 2006-286329 | 10/2006 |
| JP | 2007-91542 | 4/2007 |
| JP | 2007-188768 | 7/2007 |
| JP | 2007-200855 | 8/2007 |
| WO | WO 2006/104128 A1 | 10/2006 |

OTHER PUBLICATIONS

Machine Translation of: JP 2006/085959 Chiba H, Mar. 30, 2006.*

Machine Translation of: JP 2005/135787 Yamafuka T, May 26, 2005.*

"Active Learning of Electrochemical Engineering Principles Using a Solar Panel/Water Electrolyzer/Fuel Cell System", Fenton et al., The Electrochemical Society Interface, Fall 2006. Retrieved online on Oct. 14, 2010 from: http://www.electrochem.org/dl/interface/fal/fal06/fall06_p37-42.pdf.*

Extended European Search Report, issued May 9, 2012, in EP Application 08704532.4-2119.

* cited by examiner

WATER GENERATION AMOUNT AT RATED OUTPUT POINT
/ IONOMER VOLUME (mol/min/cm$^3$)

MEMBRANE-ELECTRODE ASSEMBLY AND FUEL CELL HAVING THE SAME

CROSS-REFERENCE TO RELATED APPLICATIONS

This application is a national phase application of International Application No. PCT/JP2008/052212, filed Feb. 5, 2008, and claims the priority of Japanese Application No. 2007-026656, filed Feb. 6, 2007, the contents of both of which are incorporated herein by reference.

TECHNICAL FIELD

This invention generally relates to a membrane-electrode assembly and a fuel cell having the membrane-electrode assembly.

BACKGROUND ART

In general, a fuel cell is a device that obtains electrical power from fuel, hydrogen and oxygen. Fuel cells are being widely developed as an energy supply system because fuel cells are environmentally superior and can achieve high energy efficiency. In particular, a polymer electrolyte fuel cell operates at relatively low temperature in all of fuel cells. And the polymer electrolyte fuel cell has favorite starting property. The polymer electrolyte fuel cell is being investigated actively in order to put into practical use in many fields.

Generally, an electrode is provided on both faces of an electrolytic membrane in the polymer electrolyte fuel cell. The electrode has, for example, catalytic metal, carbon and ion exchange resin. For example, Patent Document 1 discloses an art where weight ratio of the ion exchange resin against the carbon and a supporting density of the catalytic metal are enlarged as closer to the electrolytic membrane. It is possible to improve use efficiency of the catalytic metal and restrain reduction of voltage at the electrode with the art.
Patent Document 1: Japanese Patent Application Publication No. 2005-135787

DISCLOSURE OF THE INVENTION

Problems to be Solved by the Invention

It is, however, not possible to reduce proton transfer resistance in the electrolytic membrane sufficiently, with the art disclosed in Patent Document 1.

The present invention has an object to provide a membrane-electrode assembly reducing proton transfer resistance in an electrolytic membrane sufficiently and a fuel cell having the membrane-electrode assembly.

Means for Solving the Problems

A membrane-electrode assembly in accordance with the present invention is characterized by including an electrolytic membrane having proton conductivity and a first electrode jointed on the electrolytic membrane, wherein: the first electrode has a catalyst and a first ionomer covering the catalyst and acting as a proton exchange group; and a ratio of water-generation amount (mol/min) at rated output point of the membrane-electrode assembly/volume ($cm^3$) of the first ionomer in the first electrode is 1350 or larger.

In the membrane-electrode assembly in accordance with the present invention, water concentration in the first ionomer is sufficiently high. The water transfer toward the electrolytic membrane is therefore promoted. This results in sufficient reduction of proton transfer resistance in the electrolytic membrane in an operation condition like a high-temperature operation where the electrolytic membrane is easily dried.

Thickness of the first ionomer may be 13 nm or smaller. In this case, the water concentration in the first ionomer gets sufficiently higher. And, gas diffusivity in the first electrode gets higher. The electrical power generation reaction is therefore promoted.

The catalyst may include carbon and catalytic metal supported by the carbon. The catalytic metal supported by the carbon may be more provided in the carbon on the electrolytic membrane side than in the carbon on an opposite side of the electrolytic membrane. In this case, the water concentration in the first ionomer on the electrolytic membrane side gets higher. The water transfer toward the electrolytic membrane is therefore promoted.

A second electrode may be on the first electrode on an opposite side of the electrolytic membrane. The second electrode may have a structure in which carbon is covered with a second ionomer acting as a proton exchange group. A weight ratio of the second ionomer/the carbon in the second electrode may be smaller than that of the ratio of the first ionomer/the carbon in the first electrode. In this case, the gas diffusivity may get higher in the second electrode. The electrical power generation reaction is therefore promoted.

The catalytic metal may be supported by the carbon in the second electrode. In this case, provision efficiency of reaction gas toward the catalytic metal gets higher. Electrical power generation reaction is therefore promoted. Catalyst-supporting density of the second electrode may be smaller than that of the first electrode. In this case, the water concentration of the first electrode may be higher than that of the second electrode.

The ratio of the water-generation amount (mol/min) at the rated output point/the volume ($cm^3$) of the first ionomer in first electrode may be 1350 or larger. In this case, the water concentration in the first ionomer gets sufficiently high around the electrolytic membrane in the first electrode.

A fuel cell in accordance with the present invention is characterized by including the membrane-electrode assembly claimed in any of claims 1 to 8 and separators holding the membrane-electrode assembly therebetween. In the fuel cell in accordance with the present invention, the water concentration in the first ionomer gets sufficiently high. The water transfer toward the electrolytic membrane is therefore promoted. This results in sufficient reduction of proton transfer resistance in the electrolytic membrane in an operation condition like a high-temperature operation where the electrolytic membrane is easily dried. Electrical power generation property is improved in the fuel cell in accordance with the present invention.

Effects of the Invention

In accordance with the present invention, proton transfer resistance is sufficiently reduced. This results in improvement of the electrical power generation property.

BEST MODES FOR CARRYING OUT THE INVENTION

A description will be given of a best mode for carrying the present invention.

First Embodiment

Figure 1:
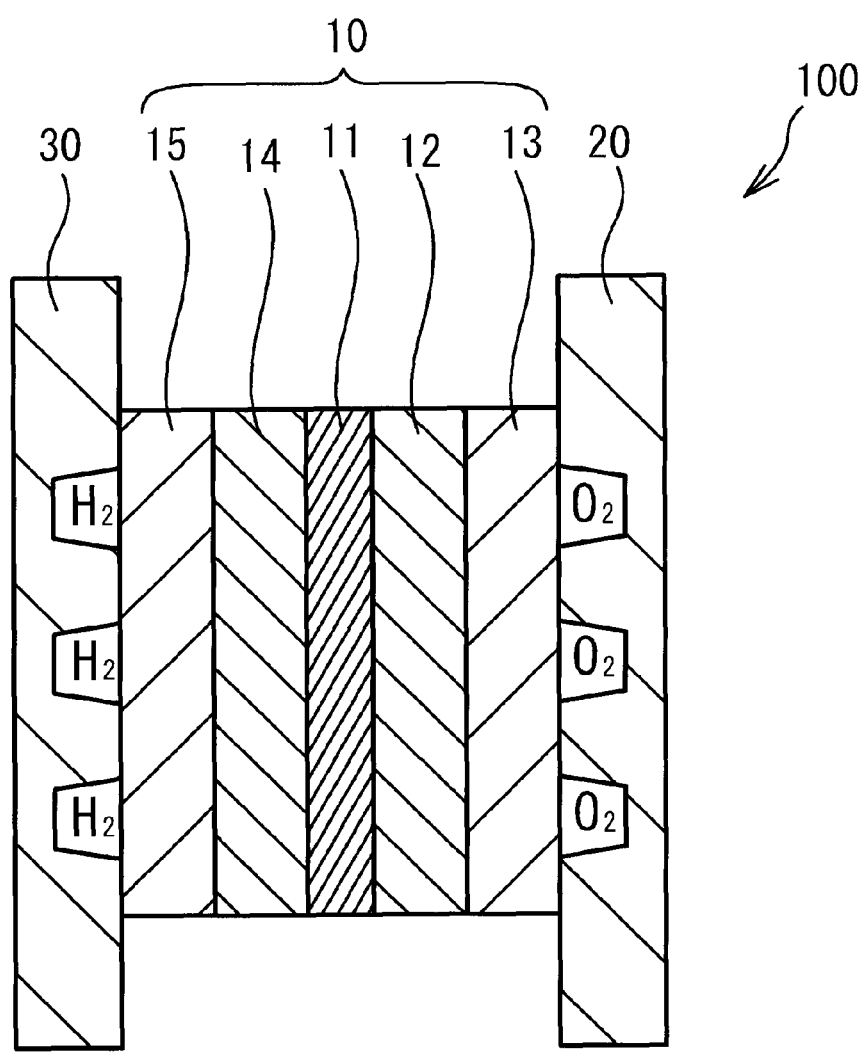
FIG. 1 illustrates a schematic cross sectional view of a fuel cell in accordance with a first embodiment of the present invention.

FIG. 1 illustrates a schematic cross sectional view of a fuel cell 100 in accordance with a first embodiment of the present invention. As illustrated in FIG. 1, the fuel cell 100 has a structure in which a separator 20 is provided on one face of a membrane-electrode assembly 10 and a separator 30 is provided on the other face of the membrane-electrode assembly 10. The membrane-electrode assembly 10 has a structure in which a cathode catalytic layer 12 and a gas diffusion layer 13 are provided in order on an electrolytic membrane 11 on the side of the separator 20, and an anode catalytic layer 14 and a gas diffusion layer 15 are provided in order on the electrolytic membrane 11 on the side of the separator 30.

The electrolytic membrane 11 is made of solid polymer electrolyte having proton conductivity, and is, for example, made of perfluorosulfonate polymer. The cathode catalytic layer 12 is a catalytic layer promoting a reaction between proton and oxygen. The anode catalytic layer 14 is a catalytic layer promoting protonation of hydrogen. A description will be given of details of the cathode catalytic layer 12 and the anode catalytic layer 14 later.

The gas diffusion layer 13 is a layer where oxidant gas including oxygen permeates. The gas diffusion layer 15 is a layer where fuel gas including hydrogen permeates. The gas diffusion layers 13 and 15 are, for example, made of carbon cloth. Oxidant gas passageway is formed on the separator 20. Fuel gas passageway is formed on the separator 30. The separators 20 and 30 may have a structure in which porous gas passageway made of foamed sintered metal is provided on a metal separator.

A fuel gas provider (not illustrated) provides fuel gas to the fuel gas passageway of the separator 30. The fuel gas permeates the gas diffusion layer 15 and gets to the anode catalytic layer 14. Hydrogen in the fuel gas is divided into proton and electron in the presence of catalyst of the anode catalytic layer 14. The proton is conducted in the electrolytic membrane 11 and gets to the cathode catalytic layer 12.

On the other hand, an oxidant gas provider (not illustrated) provides oxidant gas to the oxidant gas passageway of the separator 20. The oxidant gas permeates the gas diffusion layer 13 and gets to the cathode catalytic layer 12. The proton reacts with oxygen at the cathode catalytic layer 12 in the presence of the catalyst. Electric power and water are thus generated.

Figure 2:
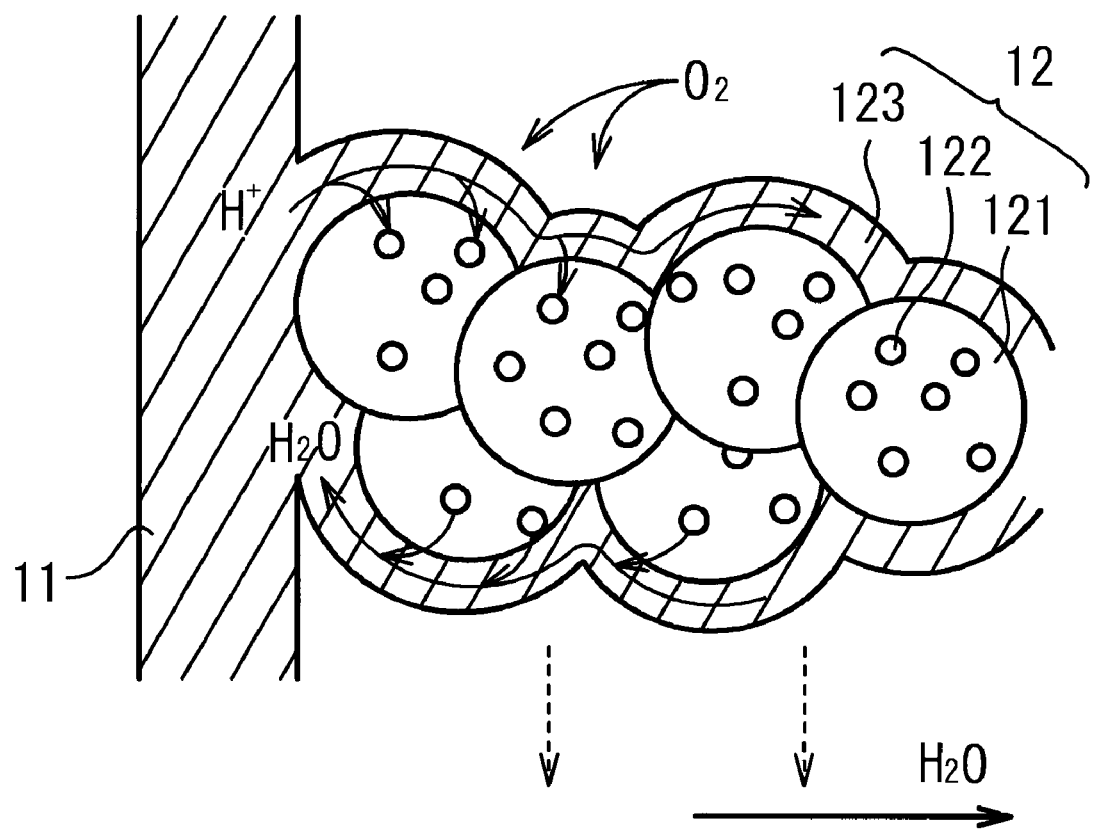
FIG. 2 illustrates a schematic view of water generation in a cathode catalytic layer.

FIG. 2 illustrates a schematic view of water generation at the cathode catalytic layer 12. As illustrated in FIG. 2, the cathode catalytic layer 12 has a three dimensional structure including particulate supporting carbons 121, a catalytic metal 122 supported by the supporting carbon 121, and an ionomer 123 covering the supporting carbon 121 and the catalytic metal 122. The catalytic metal 122 is made of platinum particle. The ionomer 123 is made of proton-exchange group. The proton-exchange group composing the ionomer 123 is not limited. The ionomer 123 may be made of Flemion (product name) made by Asahi Glass Co., Ltd.

The proton conducted in the electrolytic membrane 11 gets to the catalytic metal 122 through the ionomer 123. The oxygen permeating the gas diffusion layer 13 permeates the ionomer 123 or is solved into the ionomer 123, and gets to the catalytic metal 122. The electron gets to the catalytic metal 122 through the gas diffusion layer 13 and the supporting carbon 121 from the separator 20. Water is thus generated at the catalytic metal 122. A part of the generated water returns to the electrolytic membrane 11 through the ionomer 123, and the rest of the generated water is vaporized and is excluded through the gas diffusion layer 13.

Figure 3:
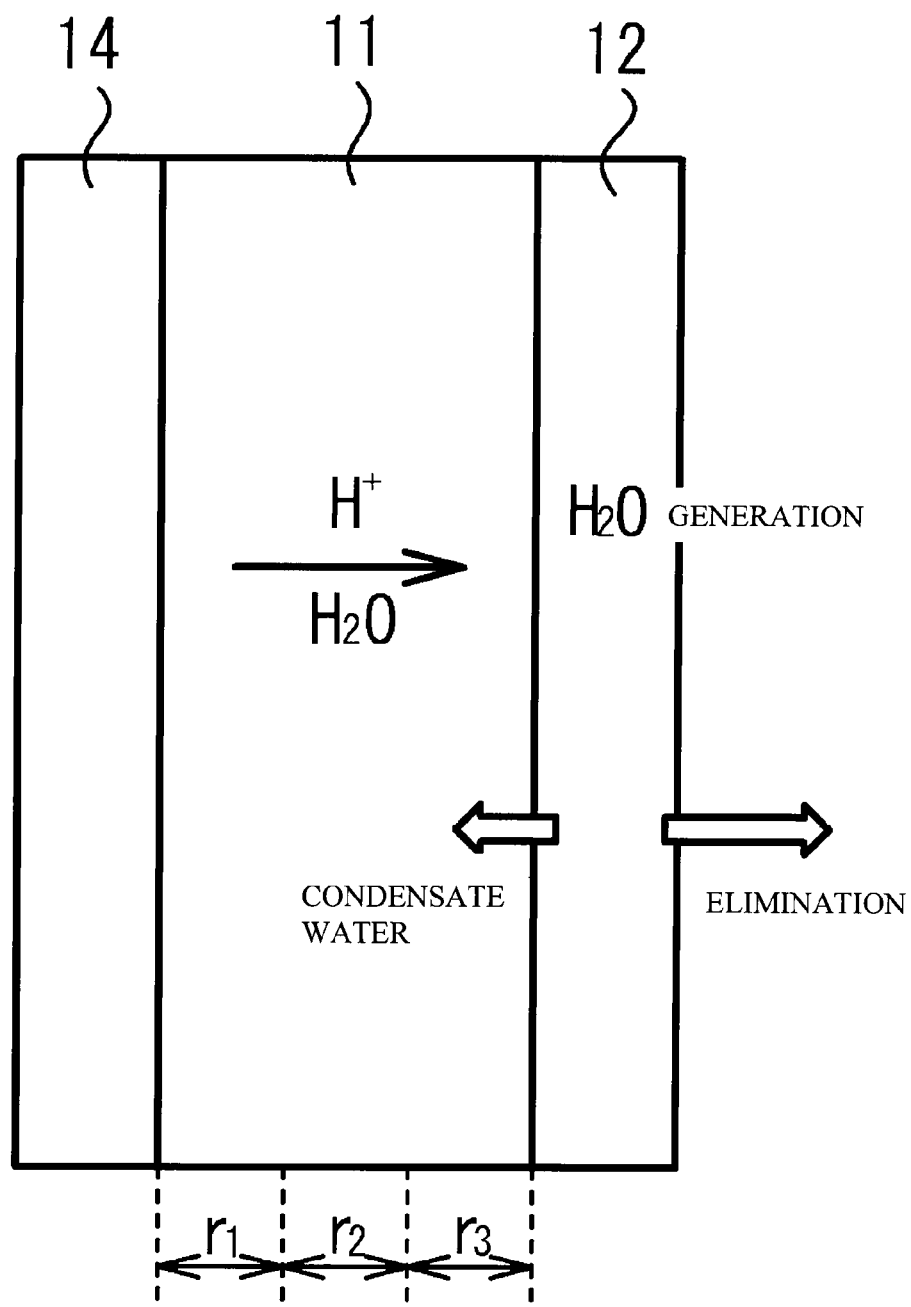
FIG. 3 illustrates a schematic view of proton transfer resistance in an electrolytic membrane.

FIG. 3 illustrates a schematic view of proton transfer resistance at the electrolytic membrane 11. As illustrated in FIG. 3, water moves according to the proton transfer when the proton moves in the electrolytic membrane 11. Water-concentration gradient is generated according to procedure of the electrical-power generation reaction in the electrolytic membrane 11. The electrolytic membrane 11 has proton transfer resistance. The transfer resistance is dependent on the water concentration in the electrolytic membrane 11.

The proton transfer resistance of the electrolytic membrane 11 is illustrated with a model in which the electrolytic membrane 11 is divided into pieces in a thickness direction thereof. In a case where the electrolytic membrane 11 is divided into three regions in the thickness direction thereof as illustrated in FIG. 3, the transfer resistance of each region is shown as $r_1$, $r_2$ and $r_3$ in order from the anode catalytic layer 14. In this case, whole transfer resistance R of the electrolytic membrane 11 is shown as $R=r_1+r_2+r_3$. The $r_1$, the $r_2$ and the $r_3$ are approximately equal to each other when water content rate of the electrolytic membrane 11 is sufficiently high. However, the water concentration gradient is generated and $r_1>r_2>r_3$ when the water content rate of the electrolytic membrane 11 is reduced. In this case, the $r_1$ is predominant factor of the whole transfer resistance R.

Water according to consumed hydrogen in the electrical power generation reaction is generated at the cathode catalytic layer 12. The amount of the generated water is determined with the reaction amount of the hydrogen or the generated current value regardless of temperature, humidity or the like. Here, the water moves from high-water-concentration side to low-water-concentration side. A part of the generated water moves to the electrolytic membrane 11 when the water content rate of the electrolytic membrane 11 is reduced.

Here, transfer speed of the water is changed according to water concentration differential. That is, the larger the water concentration differential is, the larger the transfer speed of the water is. And the smaller the water concentration differential is, the smaller the transfer speed of the water is. The smaller the water concentration of the ionomer 123 is, the smaller the transfer amount of the water to the electrolytic membrane 11 is. In the embodiment, transfer amount of the water to the electrolytic membrane 11 is enlarged when the water concentration differential between the electrolytic membrane 11 and the ionomer 123 is enlarged.

Figure 4A:
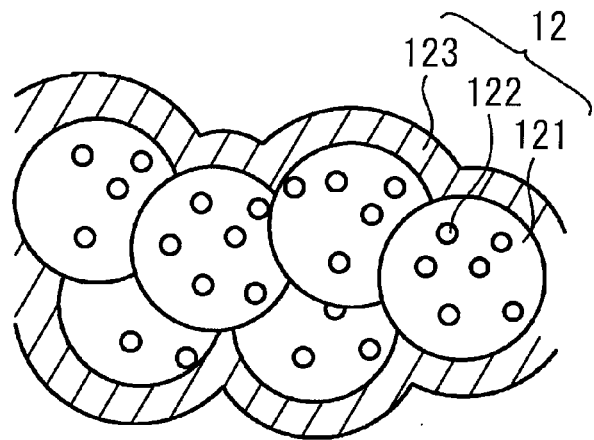
FIG. 4A through FIG. 4C illustrate a structure example of a cathode catalytic layer.
Figure 4B:
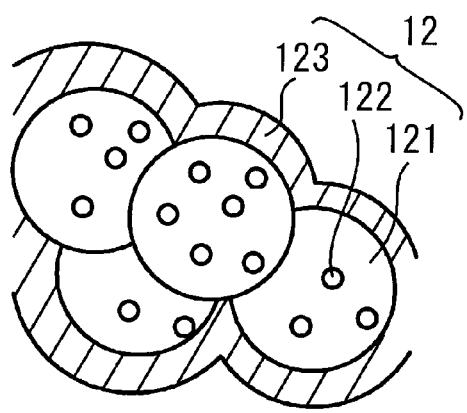
Figure 4C:
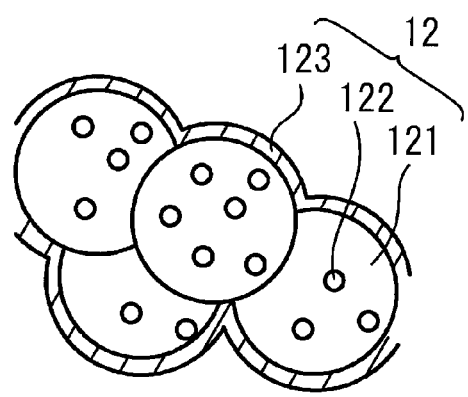

FIG. 4A through FIG. 4C illustrate an example of the structure of the cathode catalytic layer 12. The amount of the generated water per unit volume of the cathode catalytic layer 12 is enlarged if the thickness of the cathode catalytic layer 12 per unit area of the electrolytic membrane 11 is reduced without thickness changing of the ionomer 123. In this case, the water concentration in the ionomer 123 is enlarged. The water concentration in the ionomer 123 may be enlarged according to enlargement of the amount of the supported catalytic metal per the supporting carbon 121 (supporting density), as illustrated in FIG. 4A. Here, the supporting density is weight of catalytic metal/(weight of catalytic metal+ weight of carbon)×100 (wt %).

The supporting density may be enlarged as illustrated in FIG. 4A and total amount of the catalytic metal 122 may be reduced, as illustrated in FIG. 4B. That is, areal weight of the catalytic metal 122 may be reduced. Here, the areal weight is the amount of the catalytic metal 122 per electrode unit area ($mg/cm^2$). In this case, the amount of the catalytic metal 122 and the supporting carbon 121 may be reduced without changing of weight ratio of the catalytic metal 122 and the supporting carbon 121. It is therefore unnecessary to change the thickness of the ionomer 123 if the amount of the ionomer 123 with respect to the amount of the supporting carbon 121 is maintained approximately constant.

The amount of the generated water is not changed even if the total amount of the catalytic metal 122 is changed. The amount of the generated water per the catalytic metal 122 is therefore apparently enlarged. This results in apparent enlargement of the amount of the generated water per the ionomer 123. The water concentration in the ionomer 123 is therefore enlarged.

A ratio N/C may be reduced. Here, the ratio N/C is weight of ionomer/weight of carbon. In this case, the generated water per the ionomer 123 is enlarged when the amount of the generated water is constant. The thickness of the ionomer 123 may be reduced as illustrated in FIG. 4C. The water concentration in the ionomer 123 is therefore enlarged. Gas diffusion property of the cathode catalytic layer 12 is improved. The electric-power generation reaction is therefore promoted. It is preferable that the ionomer 123 has the thickness of 13 nm or smaller, in the case of FIG. 4C.

In the embodiment, the cathode catalytic layer 12 has the structure as illustrated in FIG. 4A through FIG. 4C so that the amount of the generated water (mol/min)/the volume of the ionomer 123 ($cm^3$) is 1350 or larger at rated output point of the fuel cell 100. In this case, the water concentration in the ionomer 123 is sufficiently high. Water transfer toward the electrolytic membrane 11 is therefore promoted because of the large water-concentration differential between the ionomer 123 and the electrolytic membrane 11. This results in sufficient low proton-transfer-resistance in the electrolytic membrane 11 in an operation condition such as high temperature operation where the electrolytic membrane 11 tends to be dried. Here, the amount of the generated water is a value determined based on the current value at the rated output point. The volume of the ionomer 123 is determined with the density of the ionomer species, amount of used carbon, and N/C ratio. The rated output point is an output of application limit (maximum capacity) secured by a manufacturer at a predetermined condition. The rated output point is a value posted in a product manual or product catalogue.

It is preferable that the water concentration is high in the cathode catalytic layer 12 around the electrolytic membrane 11. That is, in the cathode catalytic layer 12, the supporting density may be high around the electrolytic membrane 11. The supporting density may be gradually enlarged from the gas diffusion layer 13 to the electrolytic membrane 11. The thickness of the ionomer 123 may be low around the electrolytic membrane 11. The thickness of the ionomer 123 may be gradually reduced from the gas diffusion layer 13 to the electrolytic membrane 11. In this case, the cathode catalytic layer 12 may be formed so that the amount of the generated water (mol/min)/the volume of the ionomer 123 ($cm^3$) is 1350 or larger around the electrolytic membrane 11 at the rated output point of the fuel cell 100.

The water transfer amount toward the electrolytic membrane 11 is enlarged when the water transfer resistance in the ionomer 123 is low. Therefore, EW value (dry weight of ion exchange resin per 1 mol of ion exchange group) of the ionomer 123 may be reduced. The adhesiveness may be improved between the electrolytic membrane 11 and the cathode catalytic layer 12. The thickness of the ionomer 123 may be adjusted.

The anode catalytic layer 14 may have the same structure as the cathode catalytic layer 12 in accordance with the embodiment. In this case, the water concentration differential is enlarged between the ionomer 123 in the anode catalytic layer 14 and the electrolytic membrane 11. The water transfer toward the electrolytic membrane 11 from the anode catalytic layer 14 may be promoted. Both of the anode catalytic layer and the cathode catalytic layer may have the same structure as the cathode catalytic layer 12. One of the two may have the same structure as the cathode catalytic layer 12.

In the embodiment, at least one of the cathode catalytic layer 12 and the anode catalytic layer 14 corresponds to the first electrode, and the ionomer 123 corresponds to the first ionomer.

Second Embodiment

Figure 5A:
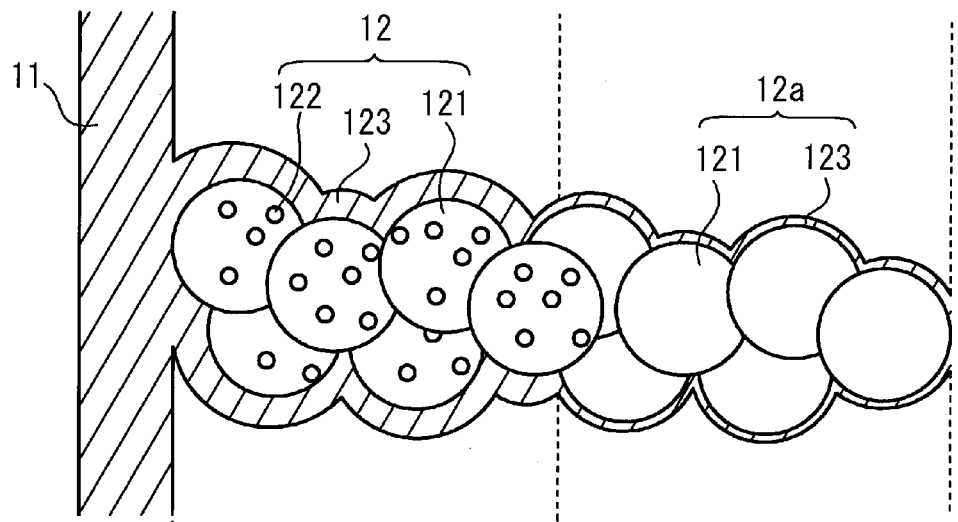
FIG. 5A and FIG. 5B illustrate a fuel cell in accordance with a second embodiment of the present invention.
Figure 5B:
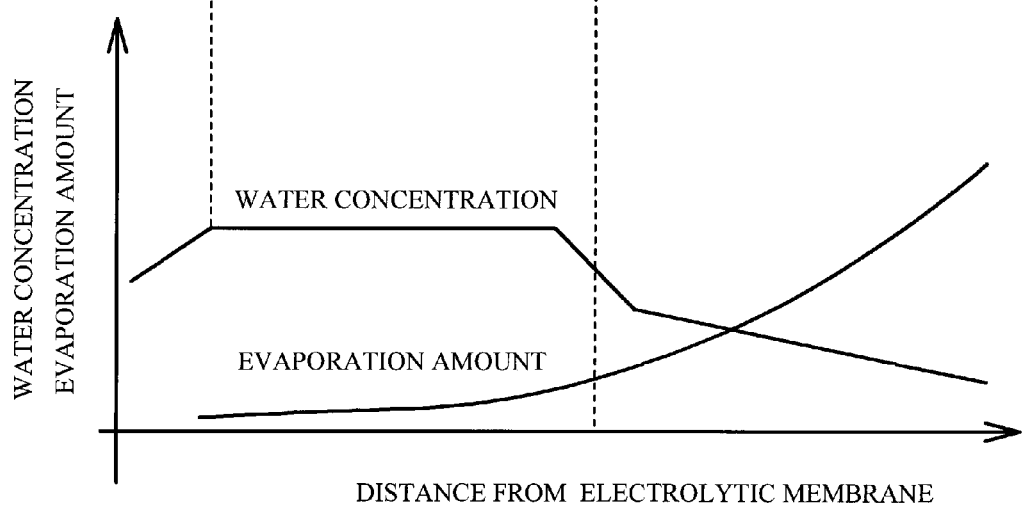

FIG. 5A and FIG. 5B illustrate a fuel cell 100a in accordance with a second embodiment of the present invention. FIG. 5A illustrates a schematic cross sectional view of a part of the fuel cell 100a. FIG. 5B illustrates water concentration and water vaporization amount in the cathode catalytic layer 12 and a cathode catalytic layer 12a described later. As illustrated in FIG. 5A, the fuel cell 100a has the cathode catalytic layer 12a on the cathode catalytic layer 12 on an opposite side of the electrolytic membrane 11. The cathode catalytic layer 12a is provided between the cathode catalytic layer 12 and the gas diffusion layer 13.

The cathode catalytic layer 12a has the supporting carbon 121 and the ionomer 123 covering the supporting carbon 121. The cathode catalytic layer 12a is different from the cathode catalytic layer 12 in a point that the catalytic metal 122 is not provided and in a point that the N/C ratio in the cathode catalytic layer 12a is lower than in the cathode catalytic layer 12. In the embodiment, the N/C ratio is adjusted with respect to the thickness of the ionomer 123. Thickness of the ionomer 123 in the cathode catalytic layer 12a is lower than the thickness of the ionomer 123 in the cathode catalytic layer 12.

In this case, gas diffusivity of the cathode catalytic layer 12a is higher than that of the cathode catalytic layer 12. This is because micropore volume of the cathode catalytic layer 12a is enlarged because of low N/C ratio. The water generated in the cathode catalytic layer 12 moves to the cathode catalytic layer 12a. The water-transfer resistance is enlarged in the cathode catalytic layer 12a because the thickness of the ionomer in the cathode catalytic layer 12a is small. Apparent evaporation amount is enlarged in the cathode catalytic layer 12a. Total evaporation amount is, however, reduced, because the evaporation is rate-controlled because of water-transfer resistance in the ionomer. This results in restraint of inhibition of the provision of the oxidant gas to the cathode catalytic layer 12 and restraint of elimination of water vapor from the cathode catalytic layer 12 and the cathode catalytic layer 12a. The water concentration in the cathode catalytic layer 12 is sufficiently high, because water is not generated in the cathode catalytic layer 12a but is generated in the cathode catalytic layer 12.

The water concentration can be sufficiently high in the ionomer 123 of the cathode catalytic layer 12. And, oxygen gas diffusion to the cathode catalytic layer 12 and water vapor elimination from the cathode catalytic layer 12 are promoted. This results in restraint of reduction of the proton-transfer resistance in the electrolytic membrane 11 and promotion of electric-power-generation reaction.

The cathode catalytic layer 12 may be formed by spraying on the electrolytic membrane 11 and may be formed by repressing to the electrolytic membrane 11. The cathode catalytic layer 12a may be formed by spraying on the cathode catalytic layer 12, and may be jointed to the cathode catalytic layer 12 with hot-pressing after spraying on the gas diffusion layer 13.

The anode catalytic layer 14 may have the same structure as the cathode catalytic layers 12 and 12a in accordance with this embodiment. Both catalytic layers on the anode side and on the cathode side may have the same structure as the cathode catalytic layers 12 and 12a. One of them may have the same structure as the cathode catalytic layers 12 and 12a. Water evaporates through the ionomer from the electrolytic membrane 11, although water is not generated in the anode catalytic layer 14. This is because amount of evaporation is reduced with limitation of water transfer amount (in the catalytic layer) toward the side closer to the passageway with respect to the water moving from the electrolytic membrane 11 to the anode catalytic layer 14.

In the embodiment, the cathode catalytic layer 12 corresponds to the first electrode, the ionomer 123 in the cathode catalytic layer 12 corresponds to the first ionomer, the cathode catalytic layer 12a corresponds to the second electrode, and the ionomer 123 in the cathode catalytic layer 12a corresponds to the second ionomer.

Third Embodiment

Figure 6:
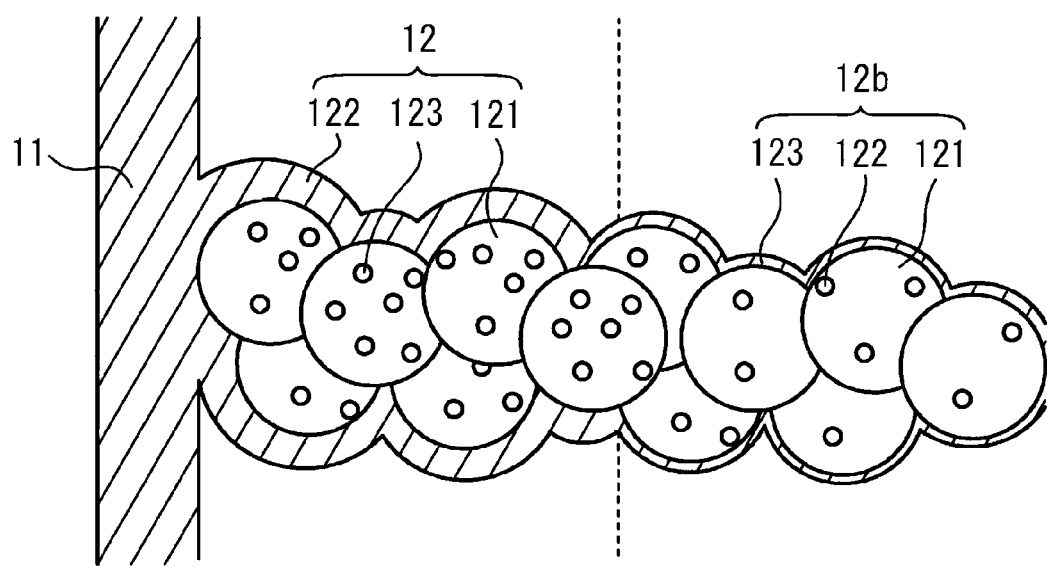
FIG. 6 illustrates a schematic cross sectional view of a part of a fuel cell in accordance with a third embodiment of the present invention.

FIG. 6 illustrates a schematic cross sectional view of a part of a fuel cell 100b in accordance with a third embodiment of the present invention. As illustrated in FIG. 6, the fuel cell 100b has a cathode catalytic layer 12b on the cathode catalytic layer 12 on an opposite side of the electrolytic membrane 11. The cathode catalytic layer 12b is provided between the cathode catalytic layer 12 and the gas diffusion layer 13.

The cathode catalytic layer 12b has the supporting carbon 121, the catalytic metal 122, the ionomer 123 covering the supporting carbon 121 and the catalytic metal 122, as in the case of the cathode catalytic layer 12. The supporting density of the cathode catalytic layer 12b is lower than that of the cathode catalytic layer 12. The N/C ratio of the cathode catalytic layer 12b is lower than that of the cathode catalytic layer 12. In this embodiment, the N/C ratio changes according to the thickness of the ionomer 123 as in the case of the second embodiment. The thickness of the ionomer 123 in the cathode catalytic layer 12b is smaller than that of the ionomer 123 in the cathode catalytic layer 12.

Efficiency of providing oxidant gas to the catalytic metal 122 is improved, because the catalytic metal 122 is in the cathode catalytic layer 12b in this embodiment. The electric-power-generation reaction is therefore promoted. Water concentration in the cathode catalytic layer 12 may be sufficiently high, because the supporting density of the cathode catalytic layer 12b is smaller than that of the cathode catalytic layer 12.

In this embodiment, the cathode catalytic layer 12 corresponds to the first electrode, the ionomer 123 in the cathode catalytic layer 12 corresponds to the first ionomer, the cathode catalytic layer 12b corresponds to the second electrode, and the ionomer 123 in the cathode catalytic layer 12b corresponds to the second ionomer.

EXAMPLE

The fuel cells in accordance with the above-mentioned embodiment were manufactured. And the property of the fuel cells was measured.

First Example Through Fourth Example

In a first example through a fourth example, the fuel cells 100 in accordance with the first embodiment were manufactured. Table 1 shows materials used for the cathode catalytic layer 12, the gas diffusion layer 13 and the separator 20, and the forming method of the cathode catalytic layer 12.

TABLE 1

| ITEM | MATERIAL USED FOR EACH EXAMPLE |
|---|---|
| ELECTROLYTIC MEMBRANE | FLUORINE RESIN |
| CATALYST SUPPORTER | Ketjen |
| CATALYST | PLATINUM |
| CATALYST-SUPPORTING CARBON | MADE BY CATALER CORPORATION |
| IONOMER | Flemion (MADE BY ASAHI GLASS) |
| FORMING METHOD OF CATALYST LAYER | SPRAY COATING |
| GAS DIFFUSION LAYER | CARBON CLOTH (MADE BY MITSUBISHI CHEMICAL) |
| SEPARATOR | METAL SEPARATOR |
| PASSAGEWAY | POROUS PASSAGEWAY |
| AREA OF ELECTRODE | 40 cm$^2$(TEST PIECE) |

Table 2 shows the areal weight of the catalytic metal 122 (mg/cm$^2$), the supporting density of the catalytic metal 122 (wt %), the N/C ratio, and a ratio of water generation amount/volume of the ionomer at rated output point of the cathode catalytic layer 12 of each example. As shown in Table 2, the first example corresponds to the structure shown in FIG. 4A, the second example corresponds to the structure shown in FIG. 4C, and the third and the fourth examples correspond to the structure shown in FIG. 4B.

TABLE 2

| ITEM | FIRST EXAMPLE | SECOND EXAMPLE | THIRD EXAMPLE | FOURTH EXAMPLE | COMPARATIVE EXAMPLE |
|---|---|---|---|---|---|
| AREAL WEIGHT (mg/cm$^2$) | 0.5 | 0.5 | 0.3 | 0.4 | 0.5 |
| Pt-SUPPORTING DENSITY(wt %) | 70 | 70 | 70 | 70 | 60 |

TABLE 2-continued

| ITEM | FIRST EXAMPLE | SECOND EXAMPLE | THIRD EXAMPLE | FOURTH EXAMPLE | COMPARATIVE EXAMPLE |
|---|---|---|---|---|---|
| N/C RATIO (WEIGHT RATIO) | 1.0 | 0.75 | 1.0 | 1.0 | 1.0 |
| THICKNESS OF IONOMER(nm) | 14.2 | 10.6 | 14.2 | 14.2 | 14.2 |
| WATER GENERATION AMOUNT/ VOLUME OF IONOMER AT RATED OUTPUT POINT (mol/min/cm$^3$) | 1372 | 1610 | 1826 | 1712 | 878 |

Comparative Example

In a comparative example, a fuel cell having an anode catalytic layer and a cathode catalytic layer, of which ratio of water generation amount/volume of the ionomer 123 at rated output point is less than 1350, was manufactured. Material and manufacturing method were the same as that of Table 1. Table 2 shows the areal weight of the catalytic metal (mg/cm$^2$), the supporting density (wt %), the N/C ratio and the water generation amount/volume of ionomer at rated output point of the cathode catalytic layer in the comparative example.

(First Analysis)

Electrical power was generated with use of the fuel cells of the first through fourth examples and the comparative example. Table 3 shows the condition of generating the electrical power. The temperature of coolant water shown in Table 3 is that of the coolant for cooling the fuel cell. The temperature of the coolant water is therefore approximately equal to the temperature of the cell in the fuel cell. Cell voltage tends to be reduced according to drying of the electrolytic membrane, because the fuel gas and the oxidant gas were not subjected to humidification process in the condition shown in Table 3.

TABLE 3

| CURRENT DENSITY(A/cm$^2$) | | 1.6 |
|---|---|---|
| BACK PRESSURE(kPaG) | ANODE | 40 |
| | CATHODE | 40 |
| STOICHIOMETRIC RATIO | ANODE | 1.5 |
| | CATHODE | 1.5 |
| HUMIDIFICATION | ANODE | NON-HUMIDIFICATION |
| | CATHODE | NON-HUMIDIFICATION |
| COOLANT TEMPERATURE (DEGREE C.) | | 80 |

Figure 7:
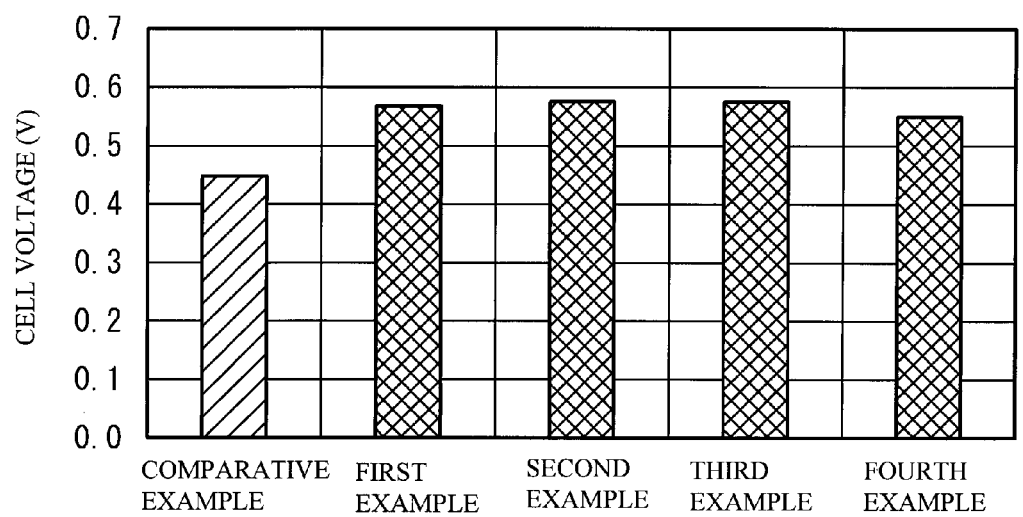
FIG. 7 illustrates cell voltage of a fuel cell of an example and a comparative example.
Figure 8:
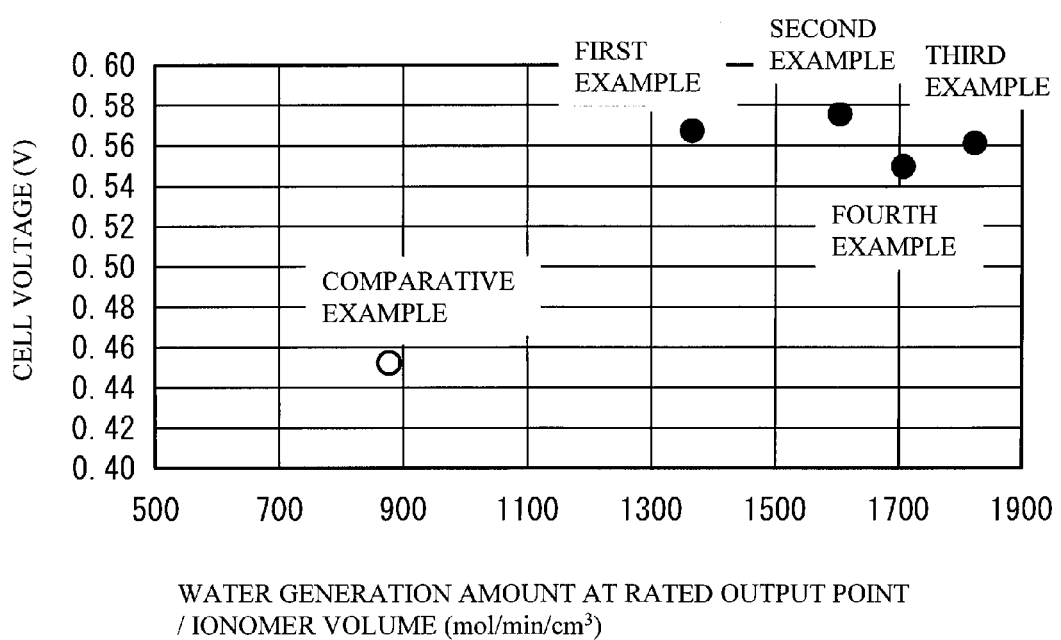
FIG. 8 illustrates cell voltage of a fuel cell of an example and a comparative example.

Table 4, FIG. 7 and FIG. 8 show the cell voltage of the fuel cells of the first through the fourth examples and the comparative example. As shown in Table 4, FIG. 7 and FIG. 8, the cell voltage of the fuel cells of the first through the fourth examples were larger than that of the comparative example. It is therefore thought that the proton transfer resistance in the electrolytic membrane was reduced sufficiently when the ratio of the water generation amount/volume of the ionomer at the rated output point was 1350 or larger. This is because the water concentration differential between the electrolytic membrane and the cathode catalytic layer was enlarged sufficiently. It is thought that the proton transfer resistance at the electrolytic membrane may be reduced sufficiently when the ratio of the water generation amount/volume of the ionomer at the rated output point is 1350 or larger, even if one of the supporting density, the areal weight of catalyst and the N/C ratio is changed.

TABLE 4

| | FIRST EXAMPLE | SECOND EXAMPLE | THIRD EXAMPLE | FOURTH EXAMPLE | COMPARATIVE EXAMPLE |
|---|---|---|---|---|---|
| WATER GENERATION AMOUNT/ VOLUME OF IONOMER AT RATED OUTPUT POINT (mol/min/cm$^3$) | 1372 | 1610 | 1826 | 1712 | 878 |
| CELL VOLTAGE(V) | 0.568 | 0.576 | 0.562 | 0.551 | 0.454 |

Fifth Example Through Eighth Example

The fuel cells 100a in accordance with the second embodiment and the fuel cells 100b in accordance with the third embodiment were manufactured, in a fifth example through eighth example. Materials of the cathode catalytic layer 12, the cathode catalytic layer 12a or the cathode catalytic layer 12b, the gas diffusion layer 13 and the separator 20, and the forming method of the cathode catalytic layer 12 were the same as in the case of Table 1.

Table 5 shows the areal weight of the catalytic metal 122 (mg/cm$^2$), the supporting density (wt %), the N/C ratio and the ratio of the water generation amount/volume of the ionomer at the rated output point of the cathode catalytic layer 12 of each example. As shown in Table 5, the fifth example corresponds to the fuel cell 100a in accordance with the second embodiment, and the sixth example through the eighth example correspond to the fuel cell 100b in accordance with the third embodiment.

TABLE 5

| ITEM | | FIFTH EXAMPLE | SIXTH EXAMPLE | SEVENTH EXAMPLE | EIGHTH EXAMPLE |
|---|---|---|---|---|---|
| MEMBRANE SIDE (FIRST LAYER) | AREAL WEIGHT OF Pt (mg/cm$^2$) | 0.4 | 0.4 | 0.4 | 0.4 |
| | Pt-SUPPORTING DENSITY (wt %) | 70 | 70 | 70 | 70 |
| | N/C RATIO (WEIGHT RATIO) | 1.0 | 1.0 | 0.85 | 1.0 |
| | WATER GENERATION AMOUNT/ VOLUME OF IONOMER AT RATED OUTPUT POINT (mol/min/cm$^3$) | 1712 | 1370 | 1611 | 1370 |
| DISSUION LAYER SIDE (SECOND LAYER) | AREAL WEIGHT OF Pt (mg/cm$^2$) | WORTH 0.1 | 0.1 | 0.1 | 0.1 |
| | Pt-SUPPORTING DENSITY (wt %) | NON Pt | 60 | 60 | 60 |
| | N/C RATIO (WEIGHT RATIO) | 0.75 | 0.75 | 0.75 | 0.85 |
| | THICKNESS OF IONOMER (nm) | 10.63 | 10.63 | 10.63 | 12.04 |

(Second Analysis)

Figure 9:
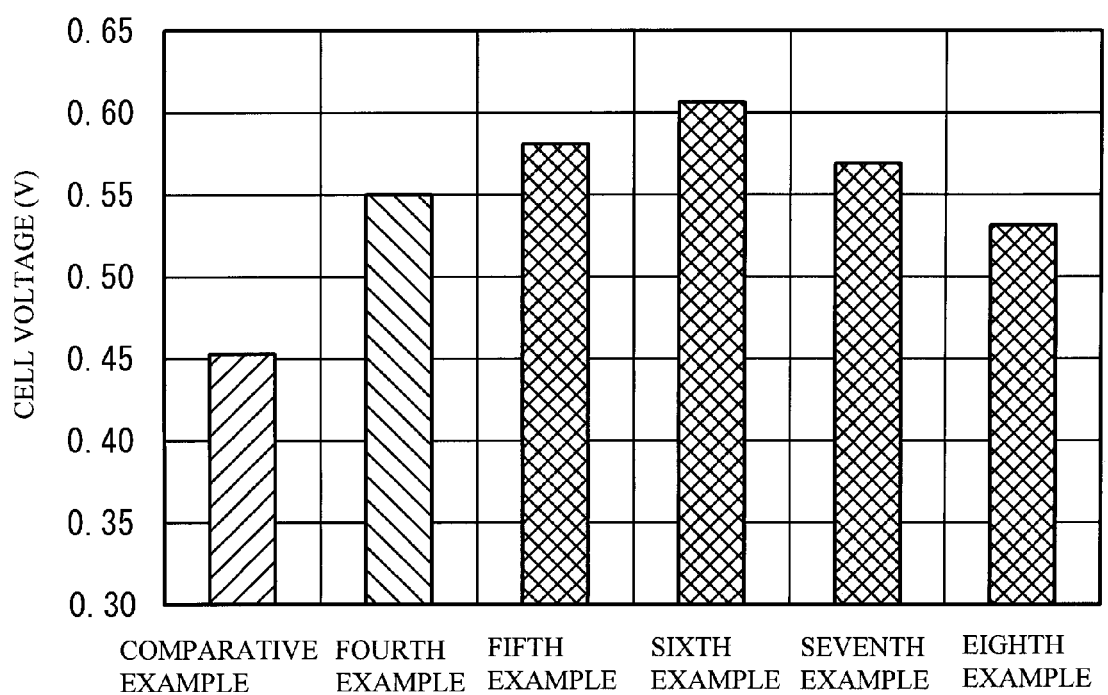
FIG. 9 illustrates cell voltage of a fuel cell of an example and a comparative example.

Electrical power was generated with use of the fuel cells of the fifth through eighth examples. The condition of generating the electrical power was the same as in the case of Table 3. Table 6 and FIG. 9 show the cell voltage of the fuel cells of the fourth example through the eighth example and the comparative example. As shown in Table 6 and FIG. 9, the cell voltage of the fuel cell of the fifth example was more enlarged than the fuel cell of the fourth example. This may be because the cathode catalytic layer 12a in accordance with the second embodiment was further provided and the gas diffusivity was improved.

TABLE 6

| | COMPARATIVE EXAMPLE | FOURTH EXAMPLE | FIFTH EXAMPLE | SIXTH EXAMPLE | SEVENTH EXAMPLE | EIGHTH EXAMPLE |
|---|---|---|---|---|---|---|
| CELL VOLTAGE(V) | 0.454 | 0.551 | 0.581 | 0.607 | 0.568 | 0.531 |
| STRUCTURE | | SINGLE LAYER | TWO LAYERS (WATER-CONCENTRATION MODERATION LAYER ON DIFFUSION LAYER SIDE) | | | |
| | | | NON Pt | Pt | | |
| WATER GENERATION AMOUNT/ VOLUME OF IONOMER AT RATED OUTPUT POINT (mol/min/cm$^3$) | 878 | 1712 | 1712 (FIRST LAYER) | 1370 (FIRST LAYER) | 1611 (FIRST LAYER) | 1370 (FIRST LAYER) |

The cell voltage of the fuel cell of the sixth example was more enlarged than that of the fifth example. This may be because the cathode catalytic layer 12b in accordance with the third embodiment was provided instead of the cathode catalytic layer 12a and the providing efficiency of the oxidant gas to the catalytic metal 122 was improved. The cell voltage of the fuel cells of the seventh example and the eighth example were, however, lower than that of the sixth example. It is therefore thought that the lower the N/C ratio of the cathode catalytic layer 12b is compared to that of the cathode catalytic layer 12, the larger the effect of the cathode catalytic layer 12b is.

(Third Analysis)

Next, the cell voltage of the fuel cells of the comparative example and the sixth example was measured in a case where the fuel gas and the oxidant gas were humidified. Table 7 shows a condition and a measured result. "RH" in Table 7 indicates relative humidity. As shown in Table 7, the cell voltage of the fuel cell of the comparative example was more reduced in a case where the reaction gas was not humidified than a case where the reaction gas was humidified. On the other hand, favorite cell voltage was obtained with the fuel cell of the sixth example in both cases where the reaction gas was humidified and where the reaction gas was not humidified. It is thought that similar result may be obtained in the fuel cells other than the sixth example. It is therefore thought the electrical power generation condition obtaining the favorite cell voltage may be enlarged with respect to the first through the eighth examples.

TABLE 7

| | HUMIDIFICATION CONDITION | CELL VOLTAGE (V) |
|---|---|---|
| COMPARATIVE EXAMPLE | HUMIDIFICATION(RH20%/ RH30%) | 0.628 |
| | NON-HUMIDIFICATION TO BOTH ELECTRODES | 0.454 |

TABLE 7-continued

| | HUMIDIFICATION CONDITION | CELL VOLTAGE (V) |
|---|---|---|
| SIXTH EXAMPLE | HUMIDIFICATION(RH20%/ RH30%) | 0.645 |
| | NON-HUMIDIFICATION TO BOTH ELECTRODES | 0.607 |

Ninth Example Through Thirteenth Embodiment

In a ninth example through a thirteenth example, the present invention was applied to the anode catalytic layer of the fuel cell in accordance with the above-mentioned embodiments. Materials of the anode catalytic layer, the cathode catalytic layer, the gas diffusion layer and the separator and the forming method of the anode catalytic layer and the cathode catalytic layer are the same as in the case of Table 1. Table 8 shows the areal weight of the catalytic metal (mg/cm$^2$), the supporting density (wt %), the N/C ratio and the ratio of water generation amount/volume of the ionomer at rated output point.

TABLE 8

| ITEM | | NINTH EXAMPLE | TENTH EXAMPLE | ELEVENTH EXAMPLE | TWELFTH EXAMPLE | THIRTEENTH EXAMPLE |
|---|---|---|---|---|---|---|
| ANODE CATALYTIC LAYER | AREAL WEIGHT OF Pt (mg/cm$^2$) | 0.2 | 0.2 | 0.2 | 0.2 | 0.2 |
| | Pt-SUPPORTING DENSITY (wt %) | 70 | 70 | 60 | 60 | 60 |
| | N/C RATIO (WEIGHT RATIO) | 1.0 | 0.75 | | | |
| CATHODE CATALYTIC LAYER | FIRST LAYER AREAL WEIGHT OF Pt (mg/cm$^2$) | 0.5 | 0.5 | 0.3 | 0.5 | 0.4 |
| | Pt-SUPPORTING DENSITY (wt %) | 60 | 60 | 70 | 70 | 70 |
| | N/C RATIO (WEIGHT RATIO) | 1.0 | 1.0 | 1.0 | 0.75 | 1.0 |
| | WATER GENERATION AMOUNT/ VOLUME OF IONOMER AT RATED OUTPUT POINT (mol/min/cm$^3$) | 878 | 878 | 1826 | 1610 | 1370 |
| | SECOND LAYER AREAL WEIGHT OF Pt (mg/cm$^2$) | — | — | — | — | 0.1 |
| | Pt-SUPPORTING DENSITY (wt %) | — | — | — | — | 60 |
| | N/C RATIO (WEIGHT RATIO) | — | — | — | — | 0.75 |

(Fourth Analysis)

Electrical power was generated with the fuel cell of the ninth example through the thirteenth example. Table 9 shows condition of the generation of the electrical power. As shown in Table 9, the electrical power was generated in three conditions where neither the fuel gas nor the oxidant gas were humidified, only the fuel gas was humidified, and both of the fuel gas and the oxidant gas were humidified.

TABLE 9

| CURRENT DENSITY(A/cm$^2$) | | 1.6 | | |
|---|---|---|---|---|
| BACK PRESSURE(kPaG) | ANODE | 40 | | |
| | CATHODE | 40 | | |
| STOICHIOMETRIC RATIO | ANODE | 1.5 | | |
| | CATHODE | 1.5 | | |
| DEW POINT Dp (DEGREE C.) | ANODE | NON-HUMIDIFICATION | 45 | 45 |
| | CATHODE | NON-HUMIDIFICATION | NON-HUMIDIFICATION | 55 |
| COOLANT TEMPERATURE (DEGREE C.) | | 80 | | |

Figure 10:
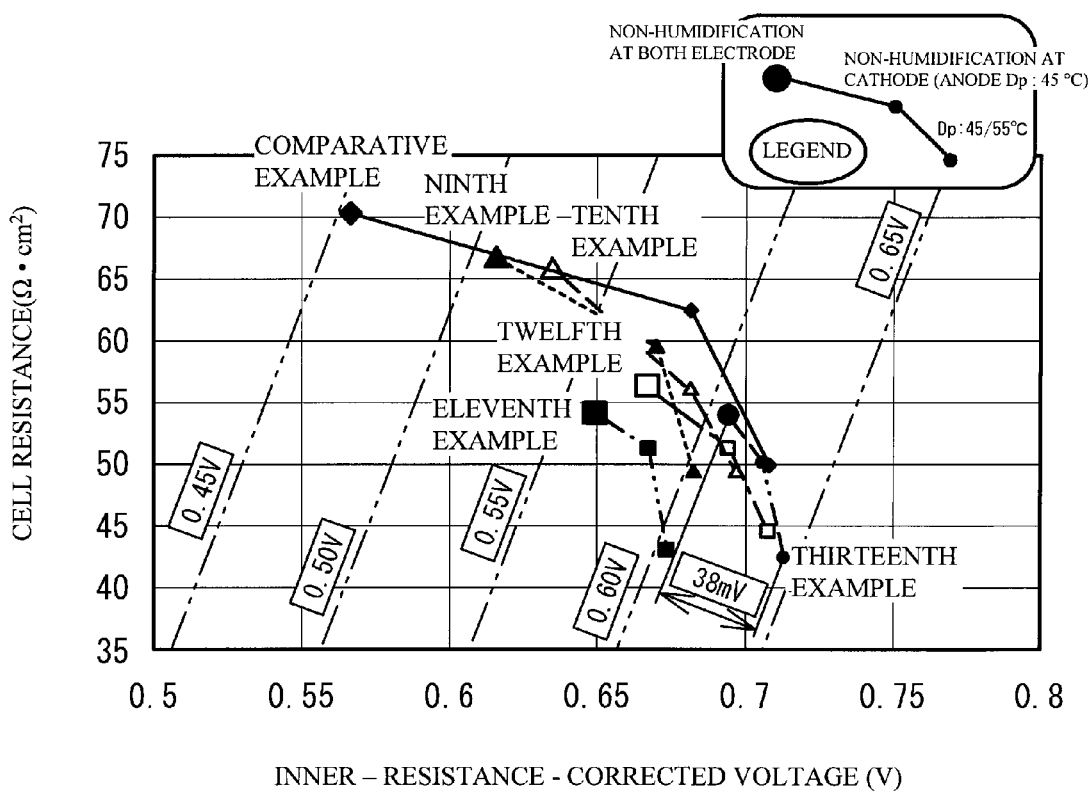
FIG. 10 illustrates cell voltage of a fuel cell of an example and a comparative example.

FIG. 10 shows the measurement result of the cell voltage. A vertical axis of FIG. 10 indicates the cell voltage. The cell resistance is an area resistance indicating the resistance per unit area. A horizontal axis of FIG. 10 indicates inner-resistance-corrected voltage. Here, the inner-resistance-corrected voltage means a voltage in a case where inner resistance loss of the cell voltage is corrected by multiplying current value according to the cell resistance by output voltage. It is thought electrical-power-generation is uneven because of inhibition of gas diffusion and drying of the electrolytic membrane, in a case where the inner-resistance-corrected voltage is low. Dashed-two dotted line of FIG. 10 indicates the cell voltage before correcting.

As shown in FIG. 10, the inner-resistance-corrected voltage was reduced according to the reduction of humidity amount to the reaction gas, in the fuel cell of the comparative example. In contrast, the reduction width of the inner-resistance-corrected voltage was reduced in a case where the humidity amount to the reaction gas was reduced, in the fuel cells of the ninth example and the tenth example. The effect of the present invention may be obtained when the present invention is applied to the anode catalytic layer.

The reduction width of the inner-resistance-corrected voltage was further reduced when the present invention was applied to the anode catalytic layer and the cathode catalytic layer, as shown in the eleventh example and the twelfth example. The reduction width of the inner-resistance-corrected voltage was further reduced when the cathode catalytic layer has the structure in accordance with the third embodiment, as shown in the thirteenth example.

The invention claimed is:

1. A membrane-electrode assembly comprising:
   an electrolytic membrane having proton conductivity; and
   a first electrode jointed on the electrolytic membrane,
   wherein:
   the first electrode has a catalyst and a first ionomer covering the catalyst and acting as a proton exchange group; and
   a ratio of water-generation amount (mol/min) at rated output point of the membrane-electrode assembly/volume (cm$^3$) of the first ionomer in the first electrode is 1610 or larger.

2. The membrane-electrode assembly as claimed in claim 1, wherein thickness of the first ionomer is 13 nm or smaller.

3. The membrane-electrode assembly as claimed in claim 1, wherein:
   the catalyst includes carbon and catalytic metal supported by the carbon; and
   the catalytic metal supported by the carbon is more provided in the carbon on the electrolytic membrane side than in the carbon on an opposite side of the electrolytic membrane.

4. The membrane-electrode assembly as claimed in claim 1, further comprising a second electrode on the first electrode on an opposite side of the electrolytic membrane,
   wherein the second electrode has a structure in which carbon is covered with a second ionomer acting as a proton exchange group.

5. The membrane-electrode assembly as claimed in claim 1, wherein a weight ratio of the second ionomer/the carbon in the second electrode is smaller than that of the ratio of the first ionomer/the carbon in the first electrode.

6. The membrane-electrode assembly as claimed in claim 1, wherein the catalytic metal is supported by the carbon in the second electrode.

7. The membrane-electrode assembly as claimed in claim 1, wherein catalyst-supporting density of the second electrode is smaller than that of the first electrode.

8. A fuel cell comprising:
- a membrane-electrode assembly comprising an electrolytic membrane having proton conductivity and a first electrode jointed on the electrolytic membrane, wherein the first electrode has a catalyst and a first ionomer covering the catalyst and acting as a proton exchange group, and a ratio of water-generation amount (mol/min) at rated output point of the membrane-electrode assembly/volume ($cm^3$) of the first ionomer in the first electrode is 1610 or larger; and
- separators holding the membrane-electrode assembly therebetween.

* * * * *